(12) United States Patent
Saijo et al.

(10) Patent No.: US 12,110,214 B2
(45) Date of Patent: Oct. 8, 2024

(54) WORK VEHICLE

(71) Applicant: TADANO LTD., Kagawa (JP)

(72) Inventors: Yoshitaka Saijo, Kagawa (JP); Masanori Oshima, Kagawa (JP); Seiji Takeda, Kagawa (JP); Tatsuya Yamaguchi, Kagawa (JP); Yudai Masuda, Kagawa (JP)

(73) Assignee: TADANO LTD., Kagawa (JP)

( * ) Notice: Subject to any disclaimer, the term of this patent is extended or adjusted under 35 U.S.C. 154(b) by 385 days.

(21) Appl. No.: 17/622,582

(22) PCT Filed: Jun. 24, 2020

(86) PCT No.: PCT/JP2020/024856
§ 371 (c)(1),
(2) Date: Dec. 23, 2021

(87) PCT Pub. No.: WO2020/262471
PCT Pub. Date: Dec. 30, 2020

(65) Prior Publication Data
US 2022/0250879 A1    Aug. 11, 2022

(30) Foreign Application Priority Data

Jun. 28, 2019   (JP) ................................ 2019-120773

(51) Int. Cl.
*B66C 23/80*    (2006.01)
(52) U.S. Cl.
CPC .................... *B66C 23/80* (2013.01)
(58) Field of Classification Search
CPC ......... B66C 23/80; B66C 23/78; B66C 23/76; B60S 9/12; B60S 9/00; B60S 9/02; B60S 9/22
See application file for complete search history.

(56) References Cited

U.S. PATENT DOCUMENTS 2,519,910 A * 8/1950 Kershaw ................ B66C 23/78
212/302
3,144,138 A * 8/1964 Brown ................... B66C 23/80
212/304

(Continued)

FOREIGN PATENT DOCUMENTS

DE    19544732 A1 * 6/1997 ............. B66C 23/54
EP    2213803 A2 * 8/2010 ............. B66C 23/80

(Continued)

OTHER PUBLICATIONS

Jul. 28, 2020, International Search Report issued for related PCT application No. PCT/JP2020/024856.

(Continued)

*Primary Examiner* — Steve Clemmons
(74) *Attorney, Agent, or Firm* — Paratus Law Group, PLLC

(57) ABSTRACT

Provided is a work vehicle that can be transported by being loaded onto a trailer without having the outriggers removed. The work vehicle (rough terrain crane) is transported by being loaded onto a low bed trailer including a low bed and a high portion (first high bed, second high bed) higher than the low bed in at least one of the front and the rear of the low bed, and includes: outrigger units (front outrigger unit, rear outrigger unit) that are mounted to the front and rear of a vehicle body; and a lift unit that lifts and lowers the outrigger units (front outrigger unit, rear outrigger unit with respect to the vehicle body.

3 Claims, 9 Drawing Sheets

(56) References Cited

U.S. PATENT DOCUMENTS

| | | | | |
|---|---|---|---|---|
| 5,348,171 A * | 9/1994 | Haman | ................... | B66C 1/66 |
| | | | | 212/304 |
| 5,437,531 A * | 8/1995 | Kress | ................... | B66C 23/54 |
| | | | | 414/734 |
| 9,296,366 B2 * | 3/2016 | Ukezeki | ................ | B66C 23/80 |
| 10,618,781 B2 * | 4/2020 | Miyazaki | ............... | B66C 23/80 |

FOREIGN PATENT DOCUMENTS

| | | | |
|---|---|---|---|
| JP | S50-097118 U | | 8/1975 |
| JP | S56-91765 U | * | 7/1981 |
| JP | S56-091765 U | | 7/1981 |
| JP | 2001026394 A | * | 1/2001 |
| JP | 2002255015 A | * | 9/2002 |
| JP | 2005125983 A | * | 5/2005 |
| JP | 2018-002043 A | | 1/2018 |
| WO | WO-2019031568 A1 | * | 2/2019 ................ B60S 9/12 |

OTHER PUBLICATIONS

Jul. 28, 2020, International Search Opinion issued for related PCT application No. PCT/JP2020/024856.

* cited by examiner

WORK VEHICLE

CROSS REFERENCE TO PRIOR APPLICATION

This application is a National Stage Patent Application of PCT International Patent Application No. PCT/JP2020/024856 (filed on Jun. 24, 2020) under 35 U.S.C. § 371, which claims priority to Japanese Patent Application No. 2019-120773 (filed on Jun. 28, 2019), which are all hereby incorporated by reference in their entirety.

TECHNICAL FIELD

The present invention relates to a work vehicle.

BACKGROUND ART

Conventionally, a work vehicle including outriggers on a front side and a rear side of a vehicle body has been known (see, for example, Patent Literature 1).

Patent Literature 1 discloses a pile driver including a front jack provided on a front side of an upper slewing body and an outrigger jack provided on a rear side of the upper slewing body.

CITATION LIST

Patent Literature

Patent Literature 1: JP 2018-2043 A

SUMMARY OF THE INVENTION

Problems to be Solved by the Invention

However, as in the configuration of Patent Literature 1, there is a problem that the outriggers need to be removed when the work vehicle is transported by being loaded onto a trailer.

Thus, an object of the present invention is to provide a work vehicle that can be transported by being loaded onto a trailer without removing outriggers.

Solutions to Problem

In order to achieve the above object, a work vehicle according to the present invention includes a pair of outriggers that stabilize a pose of the work machine, a unit that supports the pair of outriggers, and is movably coupled to a vehicle body of the work machine, and a lift unit that moves the unit upward to lift positions of lower end portions of the outriggers.

Effects of the Invention

The work vehicle according to the present invention having the above-described configuration can be transported by being loaded onto the trailer without removing the outriggers.

DESCRIPTION OF EMBODIMENTS

Figure 1:
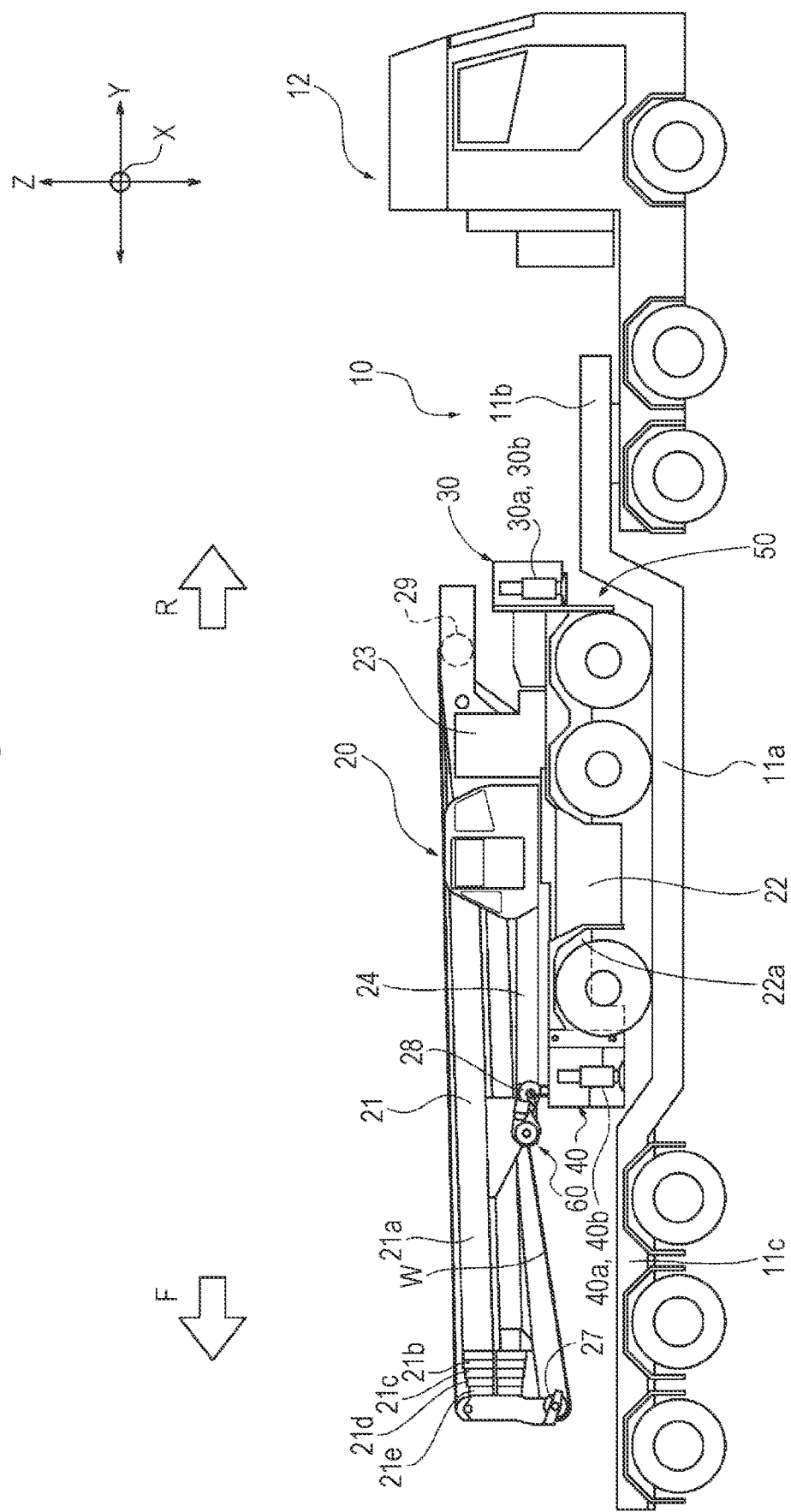
FIG. 1 is a side view illustrating a state in which a rough terrain crane according to a first embodiment is loaded onto a low bed trailer.

Hereinafter, an embodiment for realizing a work vehicle according to the present invention will be described based on a first embodiment and a second embodiment illustrated in the drawings.

First Embodiment

The work vehicle according to the first embodiment is applied to a rough terrain crane. The work vehicle according to the first embodiment is transported by being loaded onto a low bed trailer.

[Configuration of Low Bed Trailer]

FIG. 1 is a side view illustrating a state in which the rough terrain crane according to the first embodiment is loaded onto the low bed trailer. Hereinafter, a configuration of the low bed trailer according to the first embodiment will be described with reference to FIG. 1. It is assumed that a vehicle front-rear direction of a rough terrain crane 20 is a front-rear direction Y, an upper-lower direction is an upper-lower direction Z, and a vehicle width direction is a vehicle width direction X. It is assumed that in the front-rear direction Y, a front direction of the rough terrain crane 20 is defined as a front side F, and a rear direction of the rough terrain crane 20 is defined as a rear side R.

As illustrated in FIG. 1, a low bed trailer 10 is pulled by a tractor 12. The low bed trailer 10 includes a low bed 11a, and a first high bed 11b and a second high bed 11c as high portions.

The first high bed 11b is coupled to the tractor 12. The low bed 11a lower than the first high bed 11b is connected to a front side F of the first high bed 11b. The second high bed 11c higher than the low bed 11a is connected to the front side F of the low bed 11a. That is, the first high bed 11b and the second high bed 11c are at positions higher than the low bed 11a in the upper-lower direction Z.

[Configuration of Rough Terrain Crane]

Hereinafter, a configuration of the rough terrain crane according to the first embodiment will be described with reference to FIG. 1.

As illustrated in FIG. 1, the rough terrain crane 20 as the work vehicle includes a vehicle body 22 having a traveling function, a front outrigger unit 40 as an outrigger unit provided on the front side F of the vehicle body 22, a rear outrigger unit 30 as an outrigger unit provided on a rear side R of the vehicle body 22, a slewing table 23 mounted to the vehicle body 22 so as to be able to horizontally slew, and a boom 21 mounted to the slewing table 23.

The front outrigger unit 40 includes a pair of left and right front outriggers 40a and 40b that stabilize a pose of the rough terrain crane 20, and a unit 42 that supports the pair of front outriggers 40a and 40b and is movably coupled to the vehicle body of the rough terrain crane 20. The rear outrigger unit 30 includes a pair of left and right rear outriggers 30a and 30b that stabilize a pose of the rough terrain crane 20, and a unit 32 that supports the pair of rear outriggers 30a and 30b and is movably coupled to the vehicle body of the rough terrain crane 20. The front outriggers 40a and 40b and the rear outriggers 30a and 30b are expandable and contractible in the vehicle width direction X by expanding and contracting slide cylinders. The front outriggers 40a and 40b and the rear outriggers 30a and 30b are expandable and contractible in the upper-lower direction Z by expanding and contracting jack cylinders 40c and 30c. The jack cylinder 30c includes a cylinder tube 30d and a cylinder rod 30e that expands and contracts with respect to the cylinder tube 30d below the cylinder tube 30d (see FIG. 2). The jack cylinder 40c includes a cylinder tube 40d and a cylinder rod 40e that expands and contracts with respect to the cylinder tube 40d below the cylinder tube 40d (see FIGS. 6 and 8).

The vehicle body 22 includes a vehicle body frame 22a provided near a center in the vehicle width direction X so as to extend in the front-rear direction Y.

The slewing table 23 includes a pinion gear to which a power of a slewing motor is transmitted, and the pinion gear meshes with a gear provided on the vehicle body 22 to rotate about a slewing axis.

The boom 21 is formed in a telescopic manner by a base end side boom 21a, intermediate booms 21b to 21d, and a distal end side boom 21e, and are expandable and contractible by an expansion and contraction mechanism.

The base end side boom 21a is rotatably mounted to a support shaft having one end mounted to the slewing table 23 and extending in the vehicle width direction X. The base end side boom 21a can be derricked up and down with the support shaft as a rotation center. A derricking cylinder 24 is bridged between the slewing table 23 and the base end side boom 21a, and the boom 21 is derricked by extending and contracting the derricking cylinder 24.

A rotatable sheave 27 is mounted to a distal end of the distal end side boom 21e. A wire W is wound around the sheave 27. A hook 28 is mounted to one end of the wire W. The other end of the wire W is wound around a winch 29, and the wire W can be wound up or down by rotating the winch 29.

[Configuration of Lift Unit]

Figure 2:
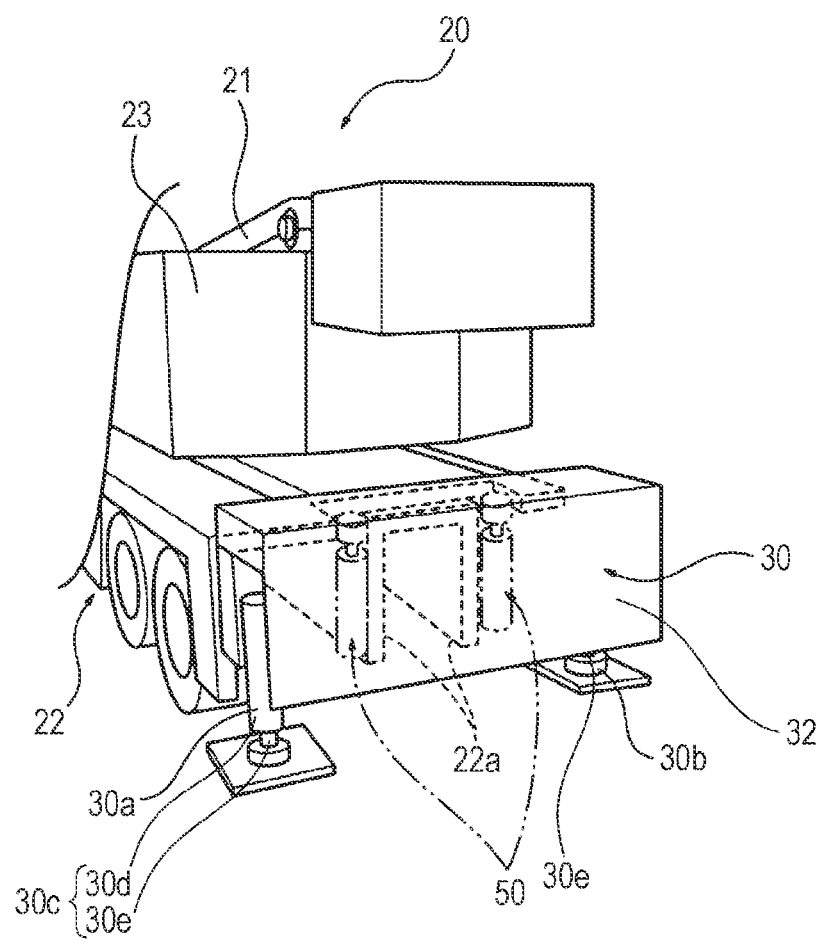
FIG. 2 is a perspective view illustrating a rear outrigger body according to the first embodiment as viewed from an obliquely rear side.
Figure 3:
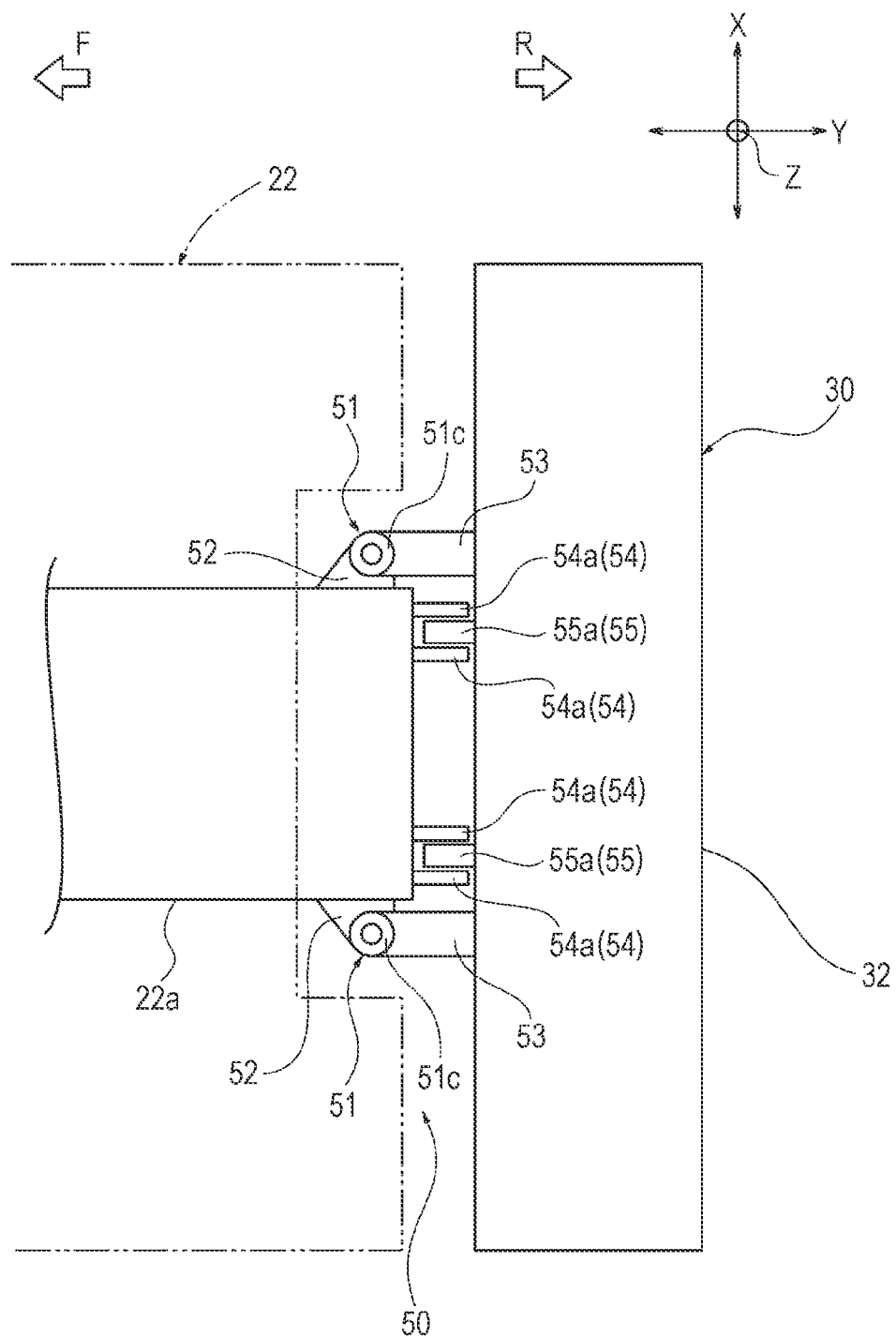
FIG. 3 is a plan view illustrating a rear outrigger body and a lift unit according to the first embodiment.
Figure 4:
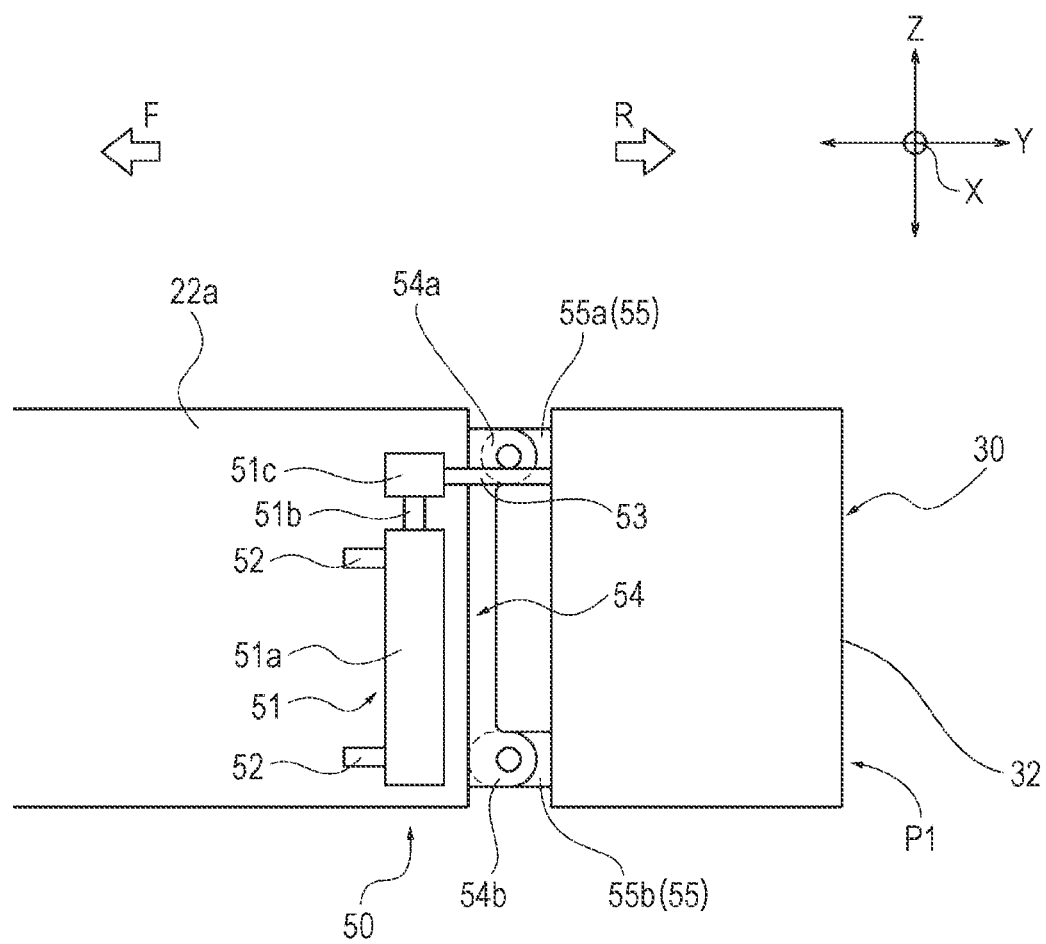
FIG. 4 is a side view illustrating the rear outrigger body and the lift unit according to the first embodiment.
Figure 5:
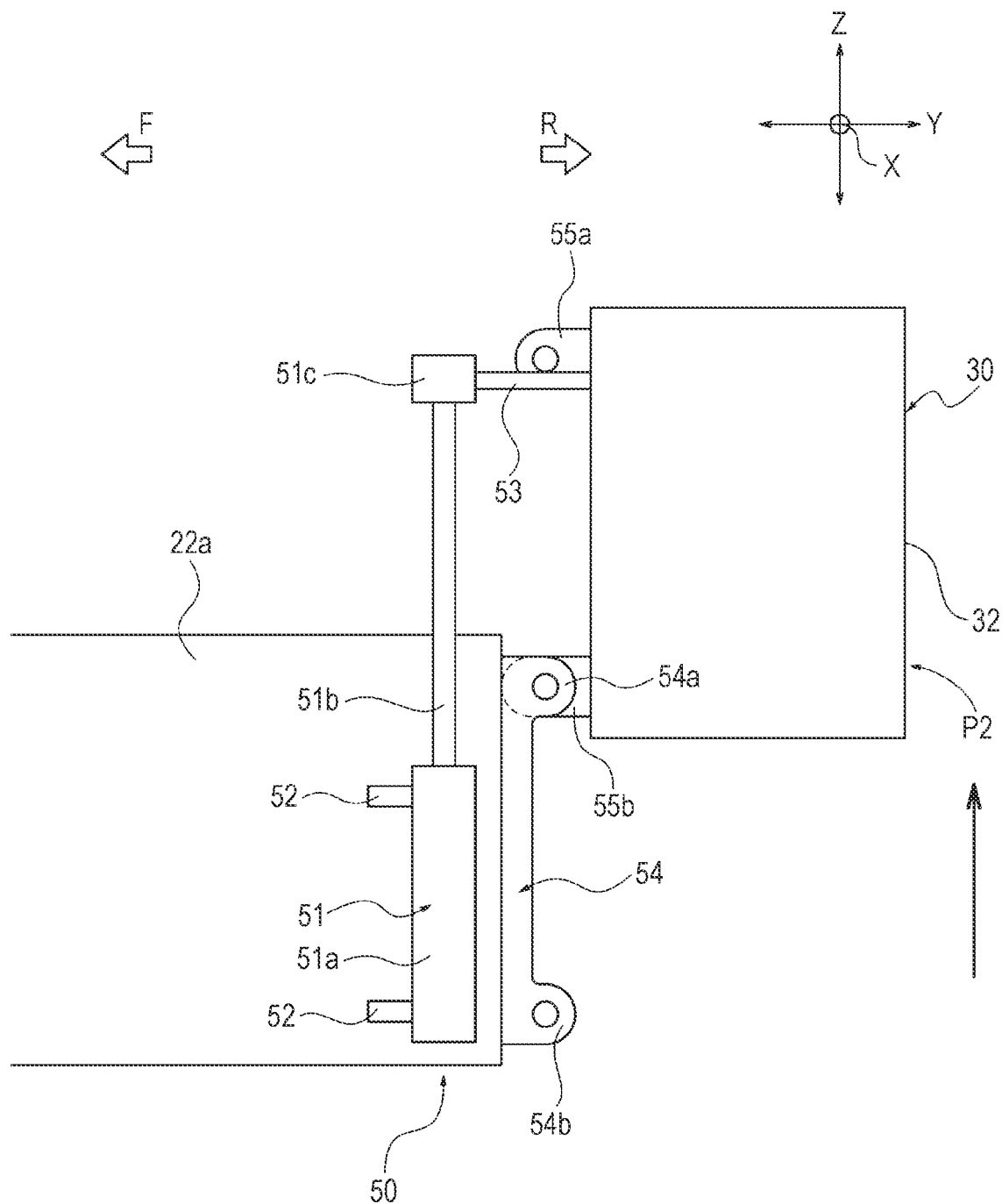
FIG. 5 is a side view illustrating a state in which the rear outrigger body according to the first embodiment is lifted and lowered.

FIG. 2 is a perspective view illustrating the rear outrigger unit according to the first embodiment as viewed from an obliquely rear side. FIG. 3 is a plan view illustrating the rear outrigger unit and the lift unit according to the first embodiment. FIG. 4 is a side view illustrating the rear outrigger unit and the lift unit according to the first embodiment. FIG. 5 is a side view illustrating a state in which the rear outrigger unit according to the first embodiment is lifted and lowered. Hereinafter, a configuration of the lift unit according to the first embodiment will be described with reference to FIGS. 2 to 5.

As illustrated in FIG. 2, a lift unit 50 is disposed between the vehicle body 22 and the rear outrigger unit 30, and lifts and lowers the rear outrigger unit 30 so as to lift and lower the entire jack cylinder 30c with respect to the vehicle body 22. The lift unit 50 moves the unit 32 upward to lift positions of lower end portions of the rear outriggers 30a and 30b.

As illustrated in FIGS. 3 and 4, the lift unit 50 includes two lift cylinders 51. The lift cylinder 51 includes a cylinder body 51a (functioning as a "cylinder" according to the present invention), a rod portion 51b (functioning as a "rod" according to the present invention) inserted into the cylinder body 51a and slidable with respect to the cylinder body 51a, and a rod distal end portion 51c mounted to a distal end of the rod portion 51b.

The rod portion 51b slides with respect to the cylinder body 51a, and thus, the lift cylinder 51 expands and contracts.

The cylinder body 51a is mounted to both side surfaces of the vehicle body frame 22a in the vehicle width direction X by two mounting brackets 52.

A coupling portion 53 that supports the unit 32 is mounted to the rod distal end portion 51c. The coupling portion 53 couples the rod distal end portion 51c and the rear outrigger unit 30 (unit 32).

Four first brackets 54 (functioning as "guide portions" according to the present invention) are mounted to a rear end of the vehicle body frame 22a.

The first bracket 54 is a plate-like member extending in the upper-lower direction Z, and is formed to protrude to the rear side R from the rear end of the vehicle body frame 22a. The two first brackets 54 are disposed so as to sandwich one second bracket 55.

A tongue-shaped upper end portion 54a is formed at an upper end of the first bracket 54. A tongue-shaped lower end portion 54b is formed at a lower end of the first bracket 54. Each of the upper end portion 54a and the lower end portion 54b has a through-hole penetrating in the vehicle width direction X.

Two second brackets 55 are mounted to a front end of the rear outrigger unit 30 (unit 32).

The second bracket 55 is a plate-like member, and includes a tongue-shaped upper edge portion 55a formed near an upper end of the rear outrigger unit 30 (unit 32) and a tongue-shaped lower edge portion 55b formed near a lower end thereof.

The upper edge portion 55a and the lower edge portion 55b are formed to extend to the front side F from the front end of the rear outrigger unit 30 (unit 32). One second bracket 55 is disposed so as to be sandwiched between the two first brackets 54. The upper edge portion 55a and the lower edge portion 55b have through-holes penetrating in the vehicle width direction X.

With the lift unit 50 having the above-described configuration, as illustrated in FIG. 4, the lift cylinder 51 contracts, and thus, the rear outrigger unit 30 (unit 32) moves to a lowered position P1. The rear outrigger unit 30 (unit 32) is fixed to the lowered position P1 by inserting a common insertion pin into both the through-holes in a state in which positions of the through-hole of the upper end portion 54a of the first bracket 54 and the through-hole of the upper edge portion 55a of the second bracket 55 in the upper-lower direction Z coincide with each other and inserting a common insertion pin into both the through-holes in a state in which positions of the through-hole of the lower end portion 54b of the first bracket 54 and the through-hole of the lower edge portion 55b of the second bracket 55 in the upper-lower direction Z coincide with each other.

As illustrated in FIG. 5, the lift cylinder 51 extends, and thus, the rear outrigger unit 30 (unit 32) moves to a lifted position P2 lifted in the upper-lower direction (vertical direction) Z along the first bracket 54 provided at the vehicle body frame 22a. The common insertion pin is inserted into both the through-holes in a state in which the positions of the through-hole of the upper end portion 54a of the first bracket 54 and the through-hole of the lower edge portion 55b of the second bracket 55 in the upper-lower direction Z coincide with each other, and thus, the rear outrigger unit 30 (unit 32) is fixed to the lifted position P2.

That is, the lift cylinder 51 lifts and lowers the rear outrigger unit 30 (unit 32) in the upper-lower direction (vertical direction) Z.

[Operations of Work Vehicle]

Hereinafter, operations of the work vehicle (rough terrain crane 20) according to the first embodiment will be described. The work vehicle (rough terrain crane 20) according to the first embodiment is the work vehicle (rough terrain crane 20) that is transported by being loaded onto the low bed trailer 10 that includes the low bed 11a and the high portions (first high bed 11b and second high bed 11c) higher than the low bed 11a on at least one of a front side and a rear side of the low bed 11a, and includes the outrigger units (front outrigger unit 40 and rear outrigger unit 30) that are mounted to the front and rear of the vehicle body 22, and the lift unit 50 that lifts and lowers the outrigger units (front outrigger unit 40 and rear outrigger unit 30) with respect to the vehicle body 22 (FIG. 1).

Accordingly, when the work vehicle (rough terrain crane 20) is loaded onto or unloaded from the low bed trailer 10, the outrigger units (front outrigger unit 40 and rear outrigger unit 30) can be set to the lifted position P2 lifted from the lowered position P1. As a result, an approach angle or a departure angle of the work vehicle (rough terrain crane 20) can be improved. The approach angle is a minimum angle formed by a tangent line drawn from a front lower end of the work vehicle to an outer periphery of a front wheel tire and the ground. The departure angle is a minimum angle formed by a tangent line drawn from a rear lower end of the work vehicle to an outer periphery of a rear wheel tire and the ground.

As illustrated in FIG. 1, the outrigger units (front outrigger unit 40 and rear outrigger unit 30) can be prevented from interfering with the high portions (first high bed 11b and second high beds 11c) of the low bed trailer 10 without removing the outrigger units (front outrigger unit 40 and rear outrigger unit 30). Thus, the work vehicle (rough terrain crane 20) can be transported by a trailer smaller than a conventional trailer.

When the work vehicle (rough terrain crane 20) travels on a steep slope, the outrigger units (front outrigger unit 40 and rear outrigger unit 30) can be lifted with respect to the vehicle body 22. Thus, the outrigger units (front outrigger unit 40 and rear outrigger unit 30) can be prevented from interfering with a road surface without removing the outrigger units (front outrigger unit 40 and rear outrigger unit 30).

In the work vehicle (rough terrain crane 20) according to the first embodiment, the lift unit 50 includes the lift cylinder 51 that vertically lifts and lowers the outrigger units (Here, it corresponds to the rear outrigger unit 30) (FIGS. 4 and 5).

Accordingly, the outrigger units (Here, it corresponds to the rear outrigger unit 30) can be lifted and lowered by the lift cylinder 51. Thus, the outrigger units (Here, it corresponds to the rear outrigger unit 30) can be lifted and lowered quickly and easily.

Second Embodiment

A work vehicle according to a second embodiment is different from the work vehicle according to the first embodiment in that the configuration of the lift unit is different.

[Configuration of Lift Unit]

Figure 6:
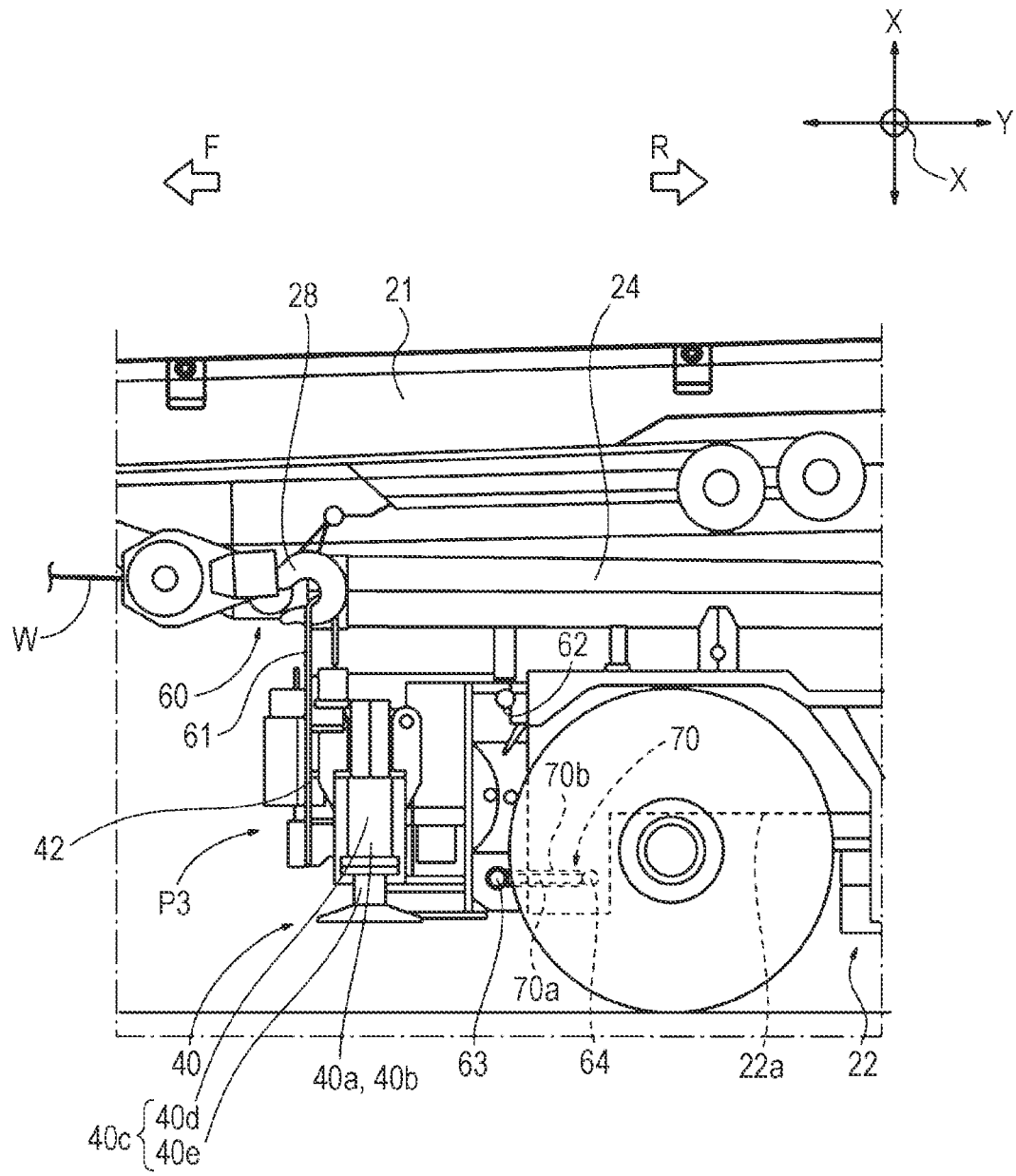
FIG. 6 is a side view illustrating a front outrigger body and a lift unit according to a second embodiment.
Figure 7:
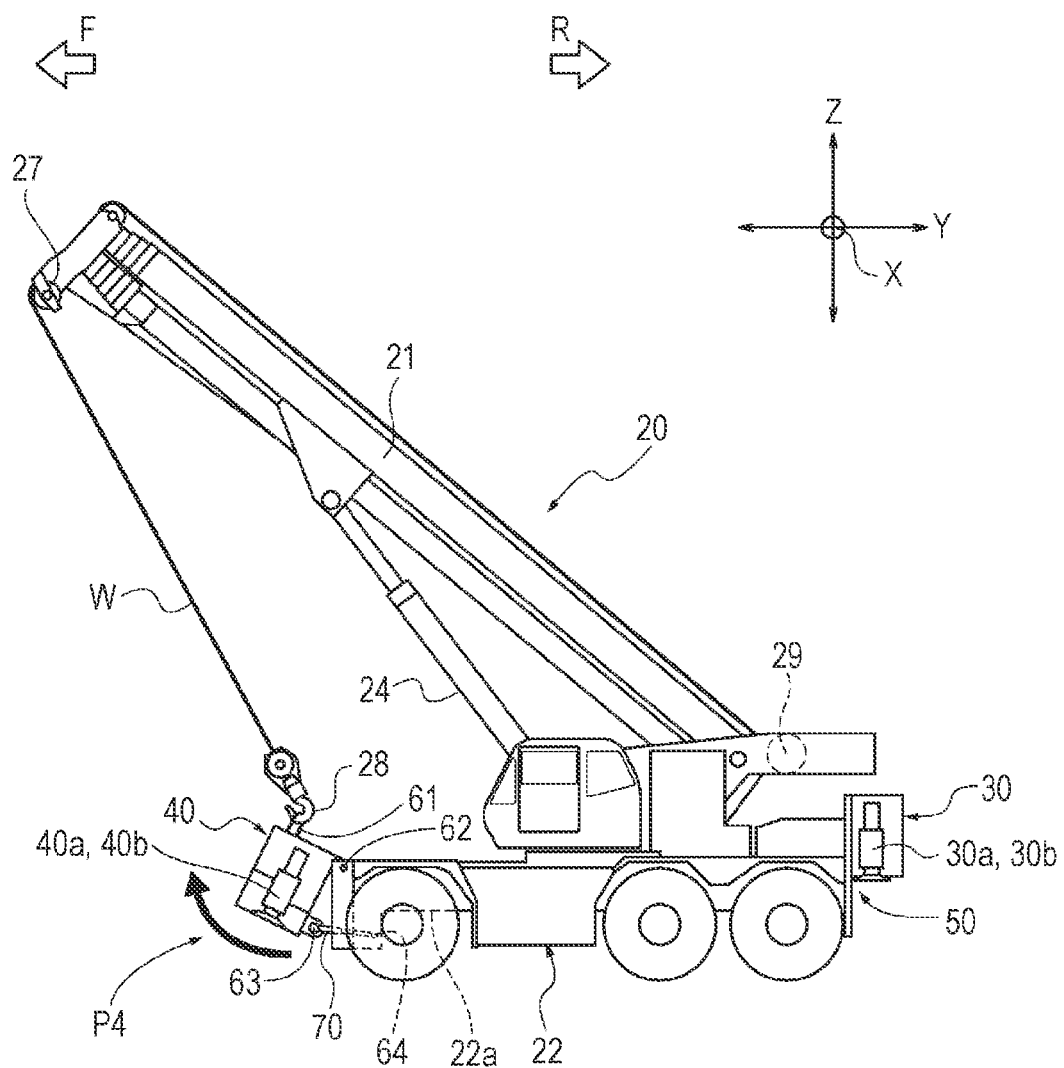
FIG. 7 is a side view illustrating a state in which a boom according to the second embodiment is raised and the front outrigger body is lifted.
Figure 8:
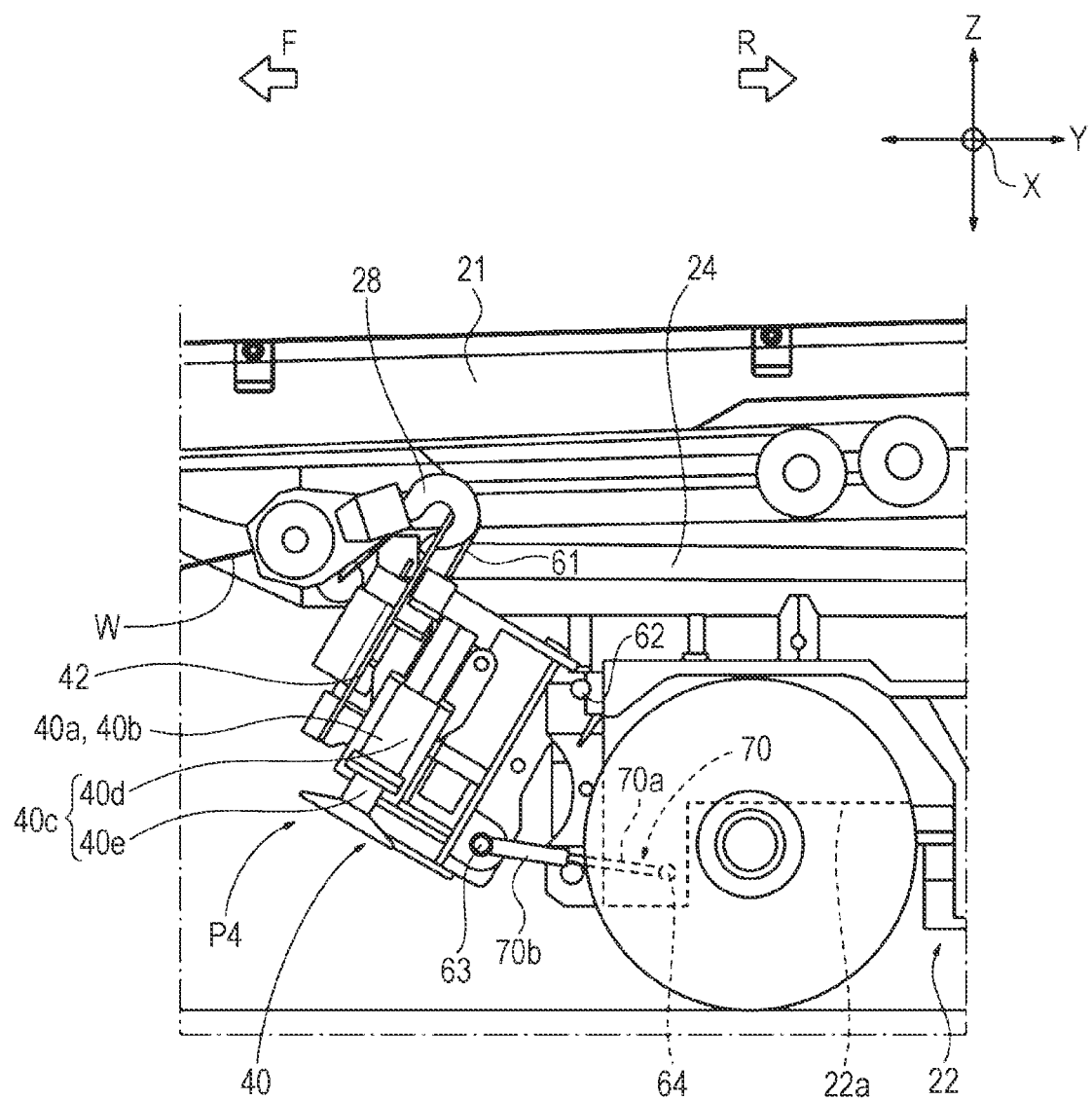
FIG. 8 is a side view illustrating a state in which the front outrigger body according to the second embodiment is lifted.

FIG. 6 is a side view illustrating a front outrigger unit and a lift unit according to the second embodiment. FIG. 7 is a side view illustrating a state in which a boom according to the second embodiment is raised and the front outrigger unit is lifted. FIG. 8 is a side view illustrating a state in which the front outrigger unit according to the second embodiment is lifted. Hereinafter, a configuration of the lift unit according to the second embodiment will be described with reference to FIGS. 6 to 8. The same or equivalent parts as the contents described in the above embodiment will be described by using the same terms or the same reference signs.

As illustrated in FIG. 6, the front outrigger unit 40 (unit 42) includes an annular portion 61 having an annular shape formed to extend upward from an upper surface of the front outrigger unit 40. The hook 28 suspended by the wire W can be mounted to the annular portion 61 (functioning as an "engagement portion" according to the present invention) via the sheave 27 provided at the distal end of the distal end side boom 21e.

A rotation shaft 62 extending in the vehicle width direction X is mounted to an upper portion on a rear side of the front outrigger unit 40 (unit 42). The rotation shaft 62 is fixed to a front side of the vehicle body frame 22a. The front outrigger unit 40 is configured to be rotatable about the rotation shaft 62 in a derricking direction of the boom 21.

A mounting shaft 63 extending in the vehicle width direction X is provided in a lower portion on a rear side of the front outrigger unit 40 (unit 42). A mounting shaft 64 extending in the vehicle width direction X is provided in a lower portion on a front side of the vehicle body frame 22a. The front outrigger unit 40 and the vehicle body frame 22a are coupled by mounting one end of a coupling member 70 to the mounting shaft 63 of the front outrigger unit 40 and mounting the other end of the coupling member 70 to the mounting shaft 64 of the vehicle body frame 22a.

The coupling member 70 includes an inner cylinder 70a and an outer cylinder 70b. The inner cylinder 70a is slidable with respect to the outer cylinder 70b. The coupling member 70 is configured to be expandable and contractible by an external force.

Each of the inner cylinder 70a and the outer cylinder 70b has a plurality of through-holes formed in an axial direction (longitudinal direction). The coupling member 70 can be fixed at a predetermined length by inserting a common pin in a state in which the through-hole of the inner cylinder 70a and the through-hole of the outer cylinder 70b coincide with each other.

In the rough terrain crane 20 having the above-described configuration, as illustrated in FIG. 6, in an initial state, the front outrigger unit 40 (unit 42) is positioned at a lowered position P3.

As illustrated in FIG. 7, the hook 28 is lifted by raising the boom 21 and winding up the wire W by the winch 29. Accordingly, the front outrigger unit 40 (unit 42) moves about the rotation shaft 62 to a lifted position P4 rotated upward in conjunction with a lifting operation of the rough terrain crane 20. The front outrigger unit 40 (unit 42) is fixed to the lifted position P4 by inserting the pin into the through-holes of the inner cylinder 70a and the outer cylinder 70b of the coupling member 70. Subsequently, the boom 21 is tilted. In this state, the rough terrain crane 20 is transported by being loaded onto the low bed trailer.

When the front outrigger unit 40 (unit 42) moves from the lifted position P4 to the lowered position P3, the boom 21 is raised, and the pin inserted into the through-holes of the inner cylinder 70a and the outer cylinder 70b of the coupling member 70 is removed while the front outrigger unit 40 is held by the hook 28. The hook 28 is lowered by winding the wire W by the winch 29, and the front outrigger unit 40 (unit 42) moves to the lowered position P3 illustrated in FIG. 6. The front outrigger unit 40 (unit 42) is fixed to the lowered position P3 by inserting the pin into the through-holes of the inner cylinder 70a and the outer cylinder 70b of the coupling member 70.

The boom 21, the winch 29, the hook 28, and the rotation shaft 62 constitute a lift unit 60 that lifts and lowers the front outrigger unit 40 (unit 42) by rotating the front outrigger unit in the derricking direction of the boom 21 so as to lift and lower the entire jack cylinder 40c. The lift unit 60 lifts the positions of the lower end portions of the front outriggers 40a and 40b by rotating the unit 42 about the rotation shaft 62 to move the unit.

[Operations of Work Vehicle]

Figure 9:
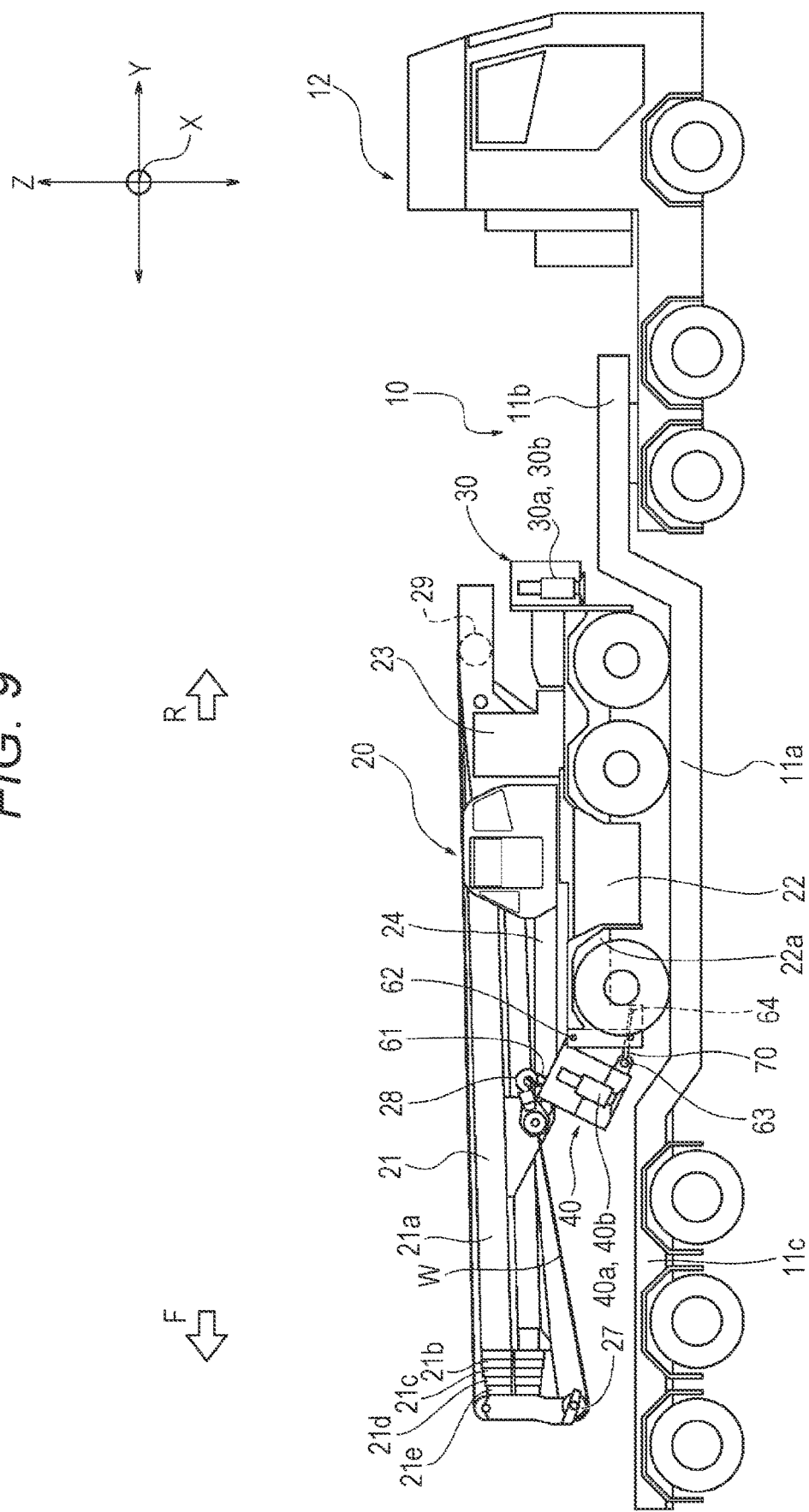
FIG. 9 is a diagram for describing operations of a rough terrain crane according to the second embodiment.

FIG. 9 is a diagram for describing operations of the rough terrain crane 20 according to the second embodiment. Hereinafter, the operations of the work vehicle (rough terrain crane 20) according to the second embodiment will be described with reference to FIG. 9.

In the work vehicle (rough terrain crane 20) according to the second embodiment, the lift unit 60 includes the rotation shaft 62 extending in the vehicle width direction X above the outrigger units (front outrigger unit 40 and rear outrigger unit 30) (FIG. 6).

Accordingly, the outrigger units (front outrigger unit 40 and rear outrigger unit 30) can be rotated upward about the rotation shaft 62 to move from the lowered position P3 to the lifted position P4. Thus, it is possible to increase the approach angle or the departure angle of the work vehicle (rough terrain crane 20) while suppressing the lift of the outrigger units (front outrigger unit 40 and rear outrigger unit 30) by lifting the outrigger units (front outrigger unit 40 and rear outrigger unit 30) in the vertical direction. As a result, for example, even when the boom or the like is disposed above the outrigger units (front outrigger unit 40 and rear outrigger unit 30), the approach angle or the departure angle of the work vehicle (rough terrain crane 20) can be increased.

In the work vehicle (rough terrain crane 20) according to the second embodiment, each of the outrigger units (front outrigger unit 40 and rear outrigger unit 30) includes the annular portion 61 to which the hook 28 suspended by the wire W from the distal end of the boom 21 is mounted (FIG. 6).

Thus, the outrigger units (front outrigger unit 40 and rear outrigger unit 30) can be rotated upward by hooking the hook 28 on the annular portion 61 and winding up the wire W with the winch 29 in a state in which the boom 21 is derricked. Thus, the outrigger units (front outrigger unit 40 and rear outrigger unit 30) can be rotated upward by using existing components of a general crane. As a result, the approach angle or the departure angle can be improved with a simple configuration.

In the work vehicle (rough terrain crane 20) according to the second embodiment, each of the outrigger units (front outrigger unit 40 and rear outrigger unit 30) includes the coupling member 70 that couples the outrigger units (front outrigger unit 40 and rear outrigger unit 30) and the vehicle body 22 in a state of being lifted by the lift unit 60 (FIG. 6).

Thus, the outrigger units (front outrigger unit 40 and rear outrigger unit 30) at the lifted position P4 can be fixed by the coupling member 70. Thus, the outrigger units (front outrigger unit 40 and rear outrigger unit 30) at the lifted position P4 can be fixed with a simple configuration.

Other configurations and operational effects are substantially the same as those of the above embodiment, and thus, the description thereof will be omitted.

The work vehicle according to the present invention has been described above based on the first embodiment and the second embodiment. However, the specific configuration is not limited to these embodiments, and design changes, additions, and the like are allowed without departing from the gist of the invention according to each claim of the claims.

In the first embodiment, the example in which the rear outrigger unit 30 is lifted and lowered in the upper-lower direction by the lift unit 50 has been described. However, the front outrigger unit 40 may also be lifted and lowered in the upper-lower direction by the lift unit 50.

In the second embodiment, the example in which the front outrigger unit 40 is lifted and lowered by the lift unit 60 by being rotated about the rotation shaft 62 has been described. However, the rear outrigger unit 30 may also be lifted or lowered by the lift unit by being rotated about the rotation shaft.

In the first embodiment, the example in which the rear outrigger unit 30 is lifted and lowered in the upper-lower direction by the lift unit 50, and the second embodiment illustrates an example in which the front outrigger unit 40 is lifted and lowered by the lift unit 60 while being rotated about the rotation shaft 62 has been described. However, the lift unit may be any aspect as long as the rear outrigger unit 30 and the front outrigger unit 40 can be lifted and lowered. For example, the rear outrigger unit 30 and the front outrigger unit 40 may be lifted and lowered by a link mechanism.

In the first embodiment, the example in which the rear outrigger unit 30 is fixed to the vehicle body frame 22a by inserting the insertion pin into the through-hole of the second bracket and the through-hole of the first bracket has been described. However, the rear outrigger unit 30 may be fixed to the vehicle body frame 22a by inserting the insertion pin into the through-hole of the second bracket and the through-hole of the first bracket using a telescopic cylinder.

In the first embodiment and the second embodiment, the example in which the low bed trailer 10 includes the low bed 11a, and the first high bed 11b and the second high bed 11c disposed in the front and the rear of the low bed 11a has been described. However, the low bed trailer is not limited to this aspect, and for example, the low bed trailer may have the high bed on one of the front side and the rear side of the low bed.

In the second embodiment, the coupling member 70 is configured to be expandable and contractible by an external force. However, the coupling portion may couple the front outrigger unit 40 and the vehicle body 22 in a state in which the front outrigger unit 40 (unit 42) is positioned at the lifted position P4.

In the first embodiment and the second embodiment, the work vehicle according to the present invention can also be applied to an all-terrain crane, a cargo crane, a truck crane, a high-place work vehicle, other construction vehicles, and the like.

REFERENCE SIGNS LIST 11a low bed
11b first high bed (example of high portion)
11c second high bed (example of high portion)
10 low bed trailer
20 rough terrain crane (example of work vehicle)

21 boom
22 vehicle body
30 rear outrigger unit (example of outrigger unit)
32, 42 unit
40 front outrigger unit (example of outrigger unit)
50 lift unit
51 lift cylinder
61 annular portion
62 rotation shaft
70 coupling member
W wire

The invention claimed is:

1. A work vehicle comprising:
a front outrigger unit provided on a front side of a vehicle body frame of the work vehicle; and
a rear outrigger unit provided on a rear side of a vehicle body frame,
wherein the rear outrigger unit includes:
  a first pair of outriggers;
  a first supporting unit that supports the first pair of outriggers, and is movably coupled to the vehicle body frame; and
  a first lift unit that includes a cylinder provided at the vehicle body frame so as to be expandable and contractible in a vertical direction, and a rod inserted into the cylinder to support the first supporting unit, and moves the first supporting unit upward to lift positions of lower end portions of the first pair of outriggers along with a lifting operation of the cylinder,
wherein the front outrigger unit includes:
  a second pair of outriggers;
  a second supporting unit that supports the second pair of outriggers, and is movably coupled to the vehicle body frame; and
  a second lift unit that includes a rotation shaft that is fixed to the vehicle body frame such that the second supporting unit is rotatable about the rotation shaft, and an engagement portion that is provided at the second support unit and to which a hook of a crane of the work vehicle is engaged, and that moves the second supporting unit upward to lift positions of lower end portions of the second pair of outriggers along with the rotation of the second supporting unit in conjunction with a lifting operation of the crane, and
wherein the work vehicle is placed on a trailer with the first pair of outriggers and the second pair of outriggers fixed in a raised position.

2. The work vehicle according to claim 1, wherein the first lift unit includes a guide portion provided at the vehicle body frame to guide the first supporting unit, the guide portion extending along the vertical direction, and
wherein the first supporting unit is fixed to the raised position by the guide portion.

3. The work vehicle: according to claim 1,
wherein the second lift unit includes
a coupling member that couples the vehicle body frame and the second supporting unit at a position below the rotation shaft, and is expandable and contractible in the front-rear direction along with the rotation of the unit in conjunction with a lifting operation of the crane, and
wherein the second supporting unit is fixed to the raised position by the coupling member.

* * * * *